US007432106B2

(12) United States Patent
Cox

(10) Patent No.: US 7,432,106 B2
(45) Date of Patent: Oct. 7, 2008

(54) LIQUID PROCESSING DEVICE INCLUDING GAS TRAP, AND SYSTEM AND METHOD

(75) Inventor: David M. Cox, Foster City, CA (US)

(73) Assignee: Applied Biosystems Inc., Foster City, CA (US)

( * ) Notice: Subject to any disclaimer, the term of this patent is extended or adjusted under 35 U.S.C. 154(b) by 788 days.

(21) Appl. No.: 10/808,229

(22) Filed: Mar. 24, 2004

(65) Prior Publication Data

US 2005/0214947 A1 Sep. 29, 2005

(51) Int. Cl.
*B01L 3/00* (2006.01)
*G01N 31/22* (2006.01)
*G01N 9/30* (2006.01)

(52) U.S. Cl. ............................ 436/45; 422/57; 422/72; 422/100

(58) Field of Classification Search .................. 436/50, 436/94, 518; 422/103, 102, 100; 435/6, 435/286.6

See application file for complete search history.

(56) References Cited

U.S. PATENT DOCUMENTS 5,472,671 A 12/1995 Nilsson et al.
5,591,643 A 1/1997 Schembri
5,746,980 A 5/1998 O'Bear et al.
5,766,553 A 6/1998 Staples et al.
6,197,595 B1 3/2001 Anderson et al.
6,429,025 B1 8/2002 Parce et al.
6,527,432 B2 3/2003 Kellogg et al.
6,551,841 B1 4/2003 Wilding et al.
6,607,907 B2 8/2003 McNeely et al.
2002/0172621 A1 11/2002 Barbera-Guillem
2003/0007898 A1 1/2003 Bohm et al.
2003/0053934 A1 3/2003 Andersson et al.
2007/0014695 A1* 1/2007 Yue et al. .................... 422/100
2007/0041878 A1* 2/2007 Bryning et al. ............. 422/103

OTHER PUBLICATIONS

Notification of Transmittal dated Oct. 25, 2006, from PCT Application No. PCT/US05/09261.
Written Opinion of International Searching Authority dated Oct. 25, 2006, from PCT Application No. PCT/US05/09261.
International Preliminary Report on Patentability dated Dec. 7, 2006, from PCTUS2005/009261.

* cited by examiner

*Primary Examiner*—Walter D. Griffin
*Assistant Examiner*—Christine T Mui

(57) ABSTRACT

A device is provided that can include at least one gas trap that can be arranged in fluid communication with a sample-containment feature formed in or on the device. The gas trap can be arranged to trap gas or air displaced from the sample-containment feature as the sample-containment feature is loaded with a liquid. The trapped gas in the gas trap can assist in breaking-up and expelling the liquid from the sample-containment feature during a subsequent liquid transfer operation, for example, to an adjacent sample-containment feature. Systems for processing such a device and methods using such a device are also provided.

33 Claims, 6 Drawing Sheets

Fig. 5.
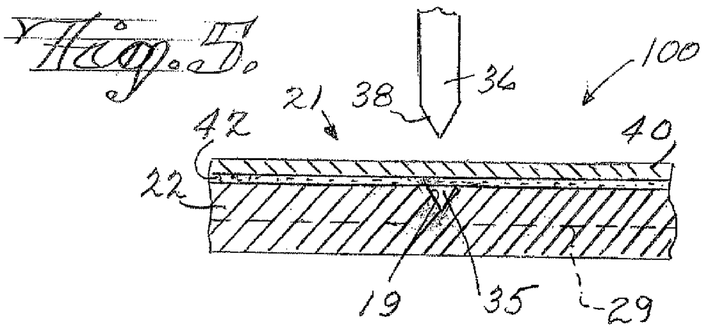
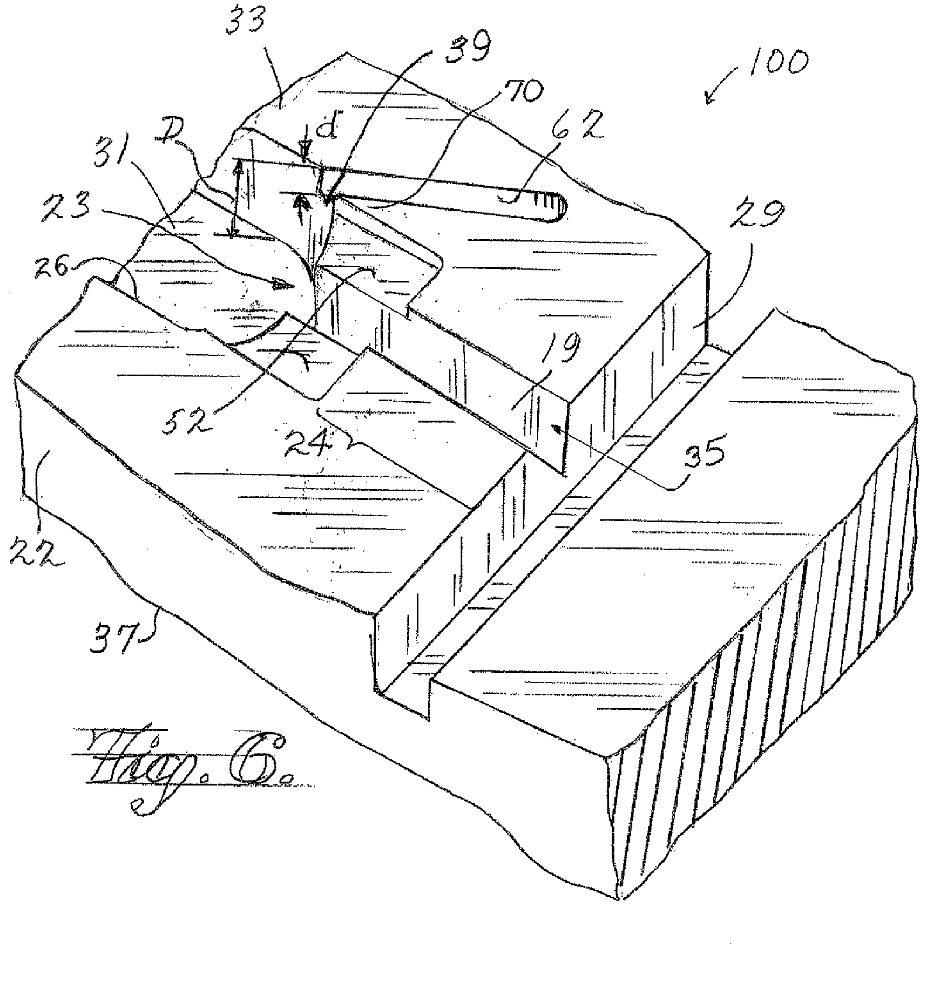
Fig. 6.

LIQUID PROCESSING DEVICE INCLUDING GAS TRAP, AND SYSTEM AND METHOD

FIELD

The present teachings relate to fluid handling assemblies, systems, and devices, and methods for using such assemblies, systems, and devices. More particularly, the present teachings relate to microfluidic fluid handling assemblies, systems, and devices, and methods for manipulating, processing, and otherwise altering small amounts of liquids and liquid samples.

BACKGROUND

Fluid processing devices are useful for manipulating small amounts of liquids. There continues to exist a need for a fluid processing device that enables controlled fluid flow through a processing pathway of the device. A need further exists for a reliable and easily actuatable device, and a system for processing the device, that together can efficiently process a small amount of liquid.

SUMMARY

According to various embodiments, the present teachings provide a fluid processing device that can include a substrate having a top surface and a bottom surface, a sample-containment feature at least partially defined by the substrate and having an inlet portion and an outlet portion, and a reservoir in fluid communication with the sample-containment feature and having a distal end portion that includes a closed end. The reservoir can extend away from the outlet portion of the sample-containment feature and can be arranged closer to the inlet portion of the sample-containment feature than to the outlet portion.

According to various embodiments, the present teachings provide a system that can include a fluid processing device having the features described above, a platen having an axis of rotation and which is capable of being rotated about the axis of rotation, and a holder capable of holding or securing the fluid processing device to the platen.

According to various embodiments, the present teachings provide a fluid processing device that can include a substrate having a top surface and a bottom surface, first and second sample-containment features formed in the substrate, a valve disposed in fluid communication with and between the first and second sample-containment features, an elongated reservoir formed in the substrate, having a closed end, and extending in a direction away from the first and second sample-containment features, and wherein the first sample-containment feature is arranged in fluid communication with the elongated reservoir.

According to various embodiments, the present teachings provide a system that includes a fluid processing device as set forth herein, and further including a platen having an axis of rotation and which is capable of being rotated about the axis of rotation. The system can include a holder capable of holding or securing the device to the platen. The system can include a heater for heating the device and/or the platen.

According to various embodiments, the present teachings provide a method that includes providing a fluid processing device including a sample-containment feature and a reservoir in fluid communication with the sample-containment feature wherein the sample-containment feature includes an inlet portion and an outlet portion, and spinning the microfluidic device to force liquid through the inlet portion and into the sample-containment feature. The method can further include trapping a gas, for example, air, in the reservoir as the gas is displaced by the liquid in the sample-containment feature, for example, as occurs when the sample-containment feature is loaded or filled with the liquid.

According to various embodiments, the present teachings provide a method that includes providing a fluid processing device including a sample-containment feature having an outlet portion, and a reservoir in fluid communication with the sample-containment feature, providing a liquid in the sample-containment feature, providing a gas in the reservoir, and spinning the device to force the liquid out of the sample-containment region and through the outlet portion.

Additional features and advantages of various embodiments will be set forth in part in the description that follows, and in part will be apparent from the description, or may be learned by practicing of various embodiments. The objectives and other advantages of various embodiments will be realized and attained by means of the elements and combinations described herein.

BRIEF DESCRIPTION OF THE DRAWINGS

FIG. 5 is a cross-sectional end view of a deformable valve taken through line 5-5 of FIG. 4, including an opening deformer, subsequent to an opening operation on the deformable valve;

FIG. 6 illustrates an enlarged, perspective view of a depression formed in a substrate of a microfluidic device by way of an opening blade deformer according to various embodiments;

Figure 1A:
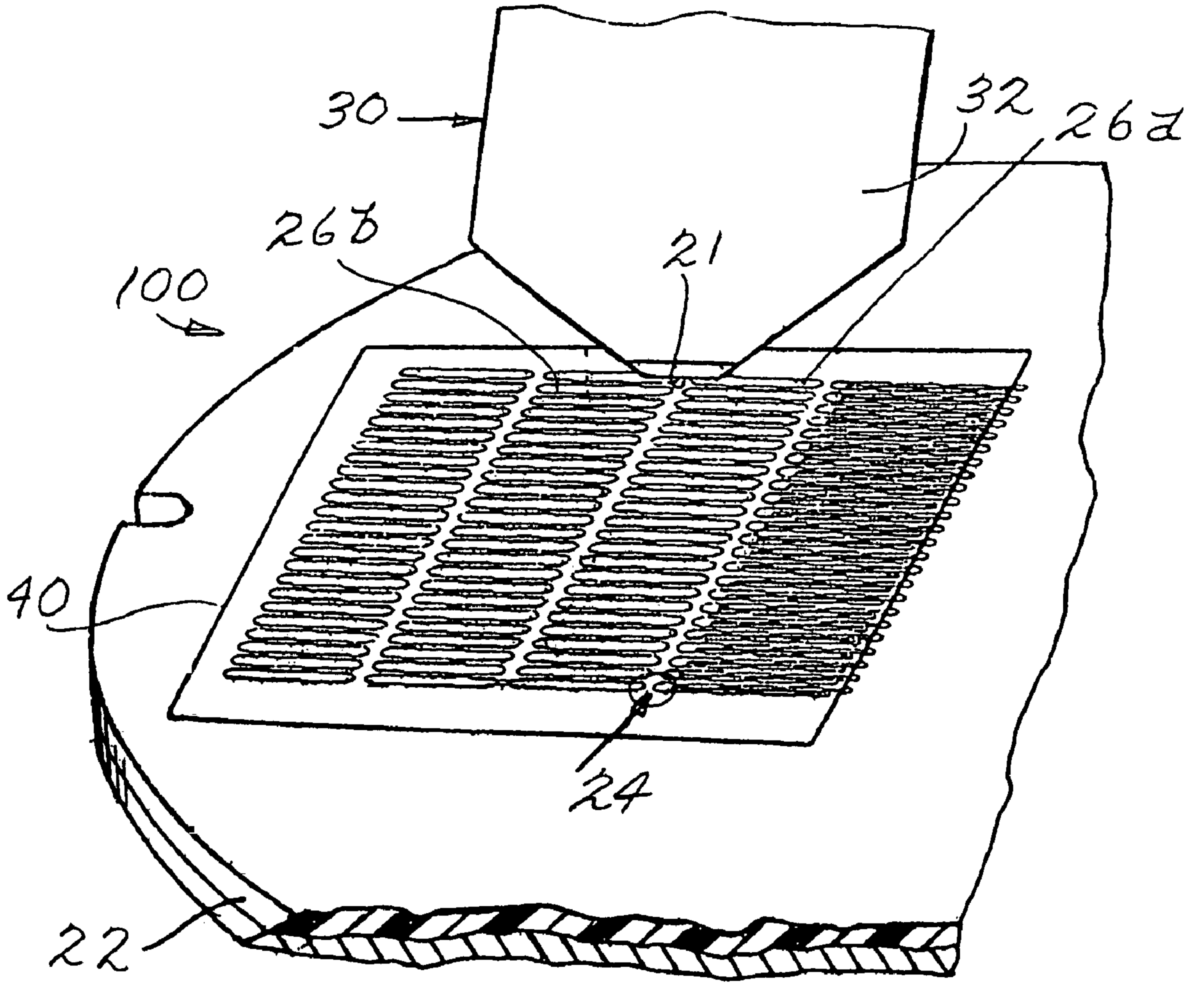
FIG. 1 is a perspective view of a microfluidic device and a valve-deforming device, in operative alignment and according to various embodiments.

It is to be understood that both the foregoing general description and the following detailed description are exemplary and explanatory only, and are intended to provide even further explanation of various embodiments of the present teachings.

DESCRIPTION

According to various embodiments, a device for manipulating liquid movement can include at least one gas trap for collecting gas that can be displaced from a sample-containment feature as the feature is loaded with a liquid. The device can be, for example, a microfluidic device, and the sample-containment feature can be one of a plurality of features formed in or on the device. The liquid can be, for example, a biological sample, an aqueous biological sample, an aqueous solution, a slurry, a gel, a blood sample, a PCR master mix, or any other liquid to be provided. The gas can be, for example, air, a noble gas, a gas non-reactive with the sample.

According to various embodiments, various types of valves can be arranged between the sample-containment feature and other channels, loading features, or sample-containment features that may be included in or on the device. The valves can be selectively opened and closed to manipulate fluid movement though the device, for example, with the assistance of a centripetal force. As will be more fully described below and as shown in the drawing figures, the gas trap can be arranged in fluid communication with the sample-containment feature and can be capable of collecting gas that is displaced from the sample-containment feature during a liquid loading procedure. When it is desired to move the liquid from the sample-containment feature to a subsequent sample-containment feature, the gas trapped in the gas trap can assist in breaking up the surface tension of the liquid and causing the liquid to be moved flurther downstream, for example, into a subsequent sample-containment feature. Spinning the device can be used to force the liquid though a processing pathway that includes the sample-containment feature. Valving methods that can be used for manipulating liquid in the devices described herein, are exemplified with reference to FIG. 1.

FIG. 1 is a perspective view of a microfluidic device 100, including a deformable valve 21 in close proximity to a valve-deforming device 30. The valve-deforming device 30 can include a deformer 32, for example, a blade-shaped deformer as shown. According to various embodiments, the deformer 32 can include a blunt tip that can optionally include a compliant pad (not shown) at its distal end. According to various embodiments, the compliant pad can include a thermally conductive material or heating source. The deformer 32 can be forced into contact with a cover sheet or layer 40 of the device 100 in an area between at least two sample-containment features, for example, between two adjacent sample wells 26*a*, 26*b*. According to various embodiments, the sample-containment features can be formed in or on a substrate 22 that defines at least a portion of the device 100. The cover sheet 40 can be made of an elastically deformable material and can include, for example, a layer of pressure sensitive or hot-melt adhesive. The device 100 can be a microfluidic device, for example, having at least one feature that includes at least one maximum dimension of 500 micrometers (μm) or less.

According to various embodiments, the deformer 32 can be forced into the cover sheet 40 with a force that can be capable of deforming the cover sheet 40 and a portion of the underlying substrate 22, to cause the deformable valve 21 to open or close. The portion of the substrate 22 to be deformed can include an intermediate wall 24 that, along with a portion of cover sheet 40, forms the deformable valve 21. In a non-deformed state of the deformable valve 21, adjacent sample-containment features of the device 100, for example, the sample wells 26*a* and 26*b*, can be maintained fluidically separated. By deforming one or more deformable valves 21 of the microfluidic device 100, respective adjacent sample-containment features can be selectively provided in fluid communication with one another. Exemplary of such deformable valves 21 are Zbig valves as shown and described in U.S. patent application Ser. No. 10/336,274, filed Jan. 3, 2003, which is incorporated herein in its entirety by reference.

Greater details with regard to the structure and operation of deformable valves, the components of microfluidic devices, and the manipulation of fluid samples through microfluidic devices, are described in U.S. Provisional Patent Applications Nos. 60/398,851, filed Jul. 26, 2002, 60/399,548, filed Jul. 30, 2002, and 60/398,777, filed Jul. 26, 2002, and in U.S. patent applications Ser. Nos. 10/336,274, 10/336,706, and 10/336,330, all three of which were filed on Jan. 3, 2003, and in U.S. patent application Ser. No. 10/403,652, filed Mar. 31, 2003. All of these provisional patent applications and non-provisional patent applications are incorporated herein in their entireties by reference.

According to various embodiments, in addition to deformable valves, such as Zbig valves, various other types of valves can be used to selectively place sample-containment features of a microfluidic device 100 in fluid communication. Exemplary of these other types of valves are microball valves, flapper valves, check valves, heat-actuated valves, diaphragm valves, pinch valves, butterfly valves, gate valves, needle valves, plug valves, combinations thereof, and the like.

Figure 2:
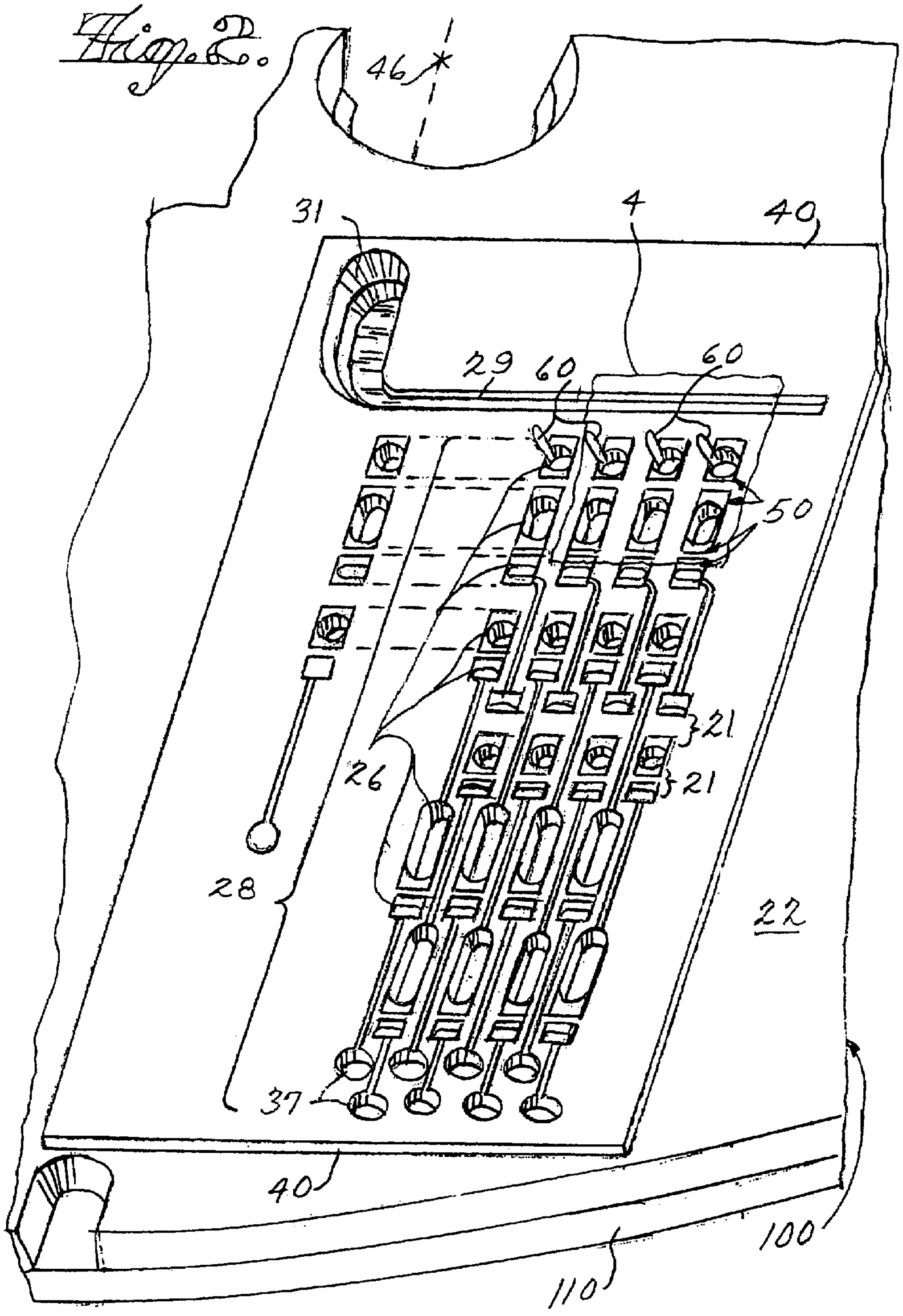
FIG. 2 is an enlarged, perspective view of a microfluidic device according to various embodiments.

FIG. 2 is an enlarged, perspective view of a disk-shaped device 100 according to various embodiments that can be used to manipulate liquids, for example, liquid samples having volumes of about 1.0 milliliter (ml) or less. The device 100 can include a disk or substrate 22 that can include a plurality of sample-processing pathways each including a plurality of sample-containment features formed therein or thereon, for example, a plurality of sample wells 26 in series. Sample wells 26, a flow-distributing manifold 29, and output chambers 37, are exemplary sample-containment features that can be included in or on the device 100. Other sample-containment features that can be included in or on the device 100 include, but are not limited to, reservoirs, recesses, channels, vias, appendices, output wells, purification columns, valves, and the like. According to various embodiments, the sample-containment features can have a variety of shapes, including circular, oval, square, cubical, rectangular, ellipsoidal, combinations of such shapes, and the like.

As shown in FIG. 2, various types of valves 21, for example, Zbig valves, can be arranged between the sample-containment features to selectively control fluid communication between adjacent ones of the sample-containment features.

According to various embodiments, the substrate 22 of the microfluidic device 100 can be at least partially formed of a deformable material, for example, an inelastically deformable material. The substrate 22 can include a single layer of material, a coated layer of material, a multi-layered material, a composite material, or a combination thereof. The substrate 22 can be formed as a single layer and can be made of a non-brittle plastic material, for example, polycarbonate, or TOPAS, a plastic cyclic olefin copolymer material available from Ticona (Celanese AG), Summit, N.J., USA. The substrate 22 can be in the shape of a disk, a rectangle, a square card, or can have any other shape. According to various embodiments, the substrate 22 along with the sample-containment features, and/or other features included or formed in or on the substrate, can be injection-molded. According to various embodiments, the sample-containment features and/or other features can be machined into or adhered or molded onto the substrate.

According to various embodiments, an elastically deformable cover sheet 40 can be adhered to at least one of the surfaces of the substrate 22. The cover sheet 40 can be made of, for example, a plastic, elastomeric, and/or other elastically deformable material.

Figure 3:
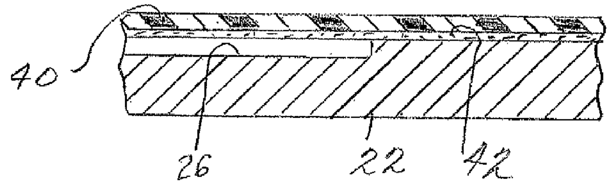
FIG. 3 is a cross-section through the microfluidic device of FIG. 2 according to various embodiments.

FIG. 3 is a cross-sectional view through an arbitrary thickness of the device 100 of FIG. 2, and shows the elastically deformable cover sheet 40 adhered to a top surface of the substrate 22 by way of a layer 42 of displaceable adhesion material. An exemplary sample-containment feature 26 is shown formed in the substrate, and can be defined by the substrate 22 and the cover sheet 40.

According to various embodiments, the displaceable adhesion material forming the layer 42 can be a material that can adhere, hold, and/or seal the cover sheet 40 to the substrate 22. The displaceable adhesion material can be any soft material, such as a plastic, for example, that can operate as an adhesive. The displaceable adhesion material can be a hard plastic. Exemplary displaceable adhesion materials can include pressure-sensitive adhesives, hot-melt adhesives, resins, glues, epoxies, silicones, urethanes, waxes, polymers, isocyanates, and combinations thereof, and the like. The displaceable adhesion material can include a silicone-based adhesive and a polyolefin cover tape, such as those tapes available from 3M, St. Paul, Minn., USA. An exemplary sample-containment feature 26 is shown in FIG. 3, and can be defined by the substrate 22 and the cover sheet 40.

According to various embodiments, the layer 42 of displaceable adhesion material can be formed as part of the cover sheet 40. For example, the displaceable adhesion material can be a soft material, such as plastic, that can be melted onto or cast onto the cover sheet 40.

According to various embodiments, and as shown in FIG. 2, a plurality of sample wells 26, can be arranged generally linearly in series on the substrate 22. Each series of sample wells 26, along with the elastically deformable cover sheet 40, can be arranged to define a sample processing pathway 28. At one end of a sample processing pathway 28, an input chamber, input channel, manifold, or flow distributor 29 can be provided. The flow distributor 29 can include an input opening 31 arranged at one end thereof, for the introduction of one or more liquids or liquid samples. For example, one or more liquids can be introduced to flow distributor 29 by piercing through the cover sheet 40 in the area of the input opening 31 and injecting the one or more liquids into the input opening 31.

According to various embodiments, and as shown in FIG. 2, more than one sample processing pathway 28 can be arranged side-by-side in or on the substrate 22, such that a plurality of samples can be simultaneously processed on a single device 100. For example, 12, 24, 48, 96, 192, 384, or more sample processing pathways 28 can be arranged side-by-side to form a set of sample processing pathways on a single device 100. Moreover, two or more sets of sample processing pathways can be arranged on a single device 100. At an opposite end of a sample processing pathway 28, one or more output chambers 37 can be provided.

According to various embodiments, the device 100 can include a central axis of rotation 46. The microfluidic device 100 can be spun about the central axis of rotation 46 to force fluid samples radially outwardly by way of generated centripetal forces. By spinning, the injected liquid can be selectively communicated from one sample-containment feature of the device 100 to another. By selectively spinning the device about the central axis of rotation 46, a fluid sample can be forced to move sequentially from the flow distributor 29, through sample-containment features, and to an output chamber 37, for example. According to various embodiments, a platen and/or a holder 110 can be arranged to support and rotate the device 100 about the same axis of rotation as that of the platen and/or holder 110. According to various embodiments and as shown in FIG. 2, the axis of rotation of the platen and/or holder 110 can be coaxial with the axis of rotation 46 of the device 100. The axis of rotation 46 of the device 100 can be centrally located, for example, in the center of the device if the device 100 is disk-shaped.

Figure 4:
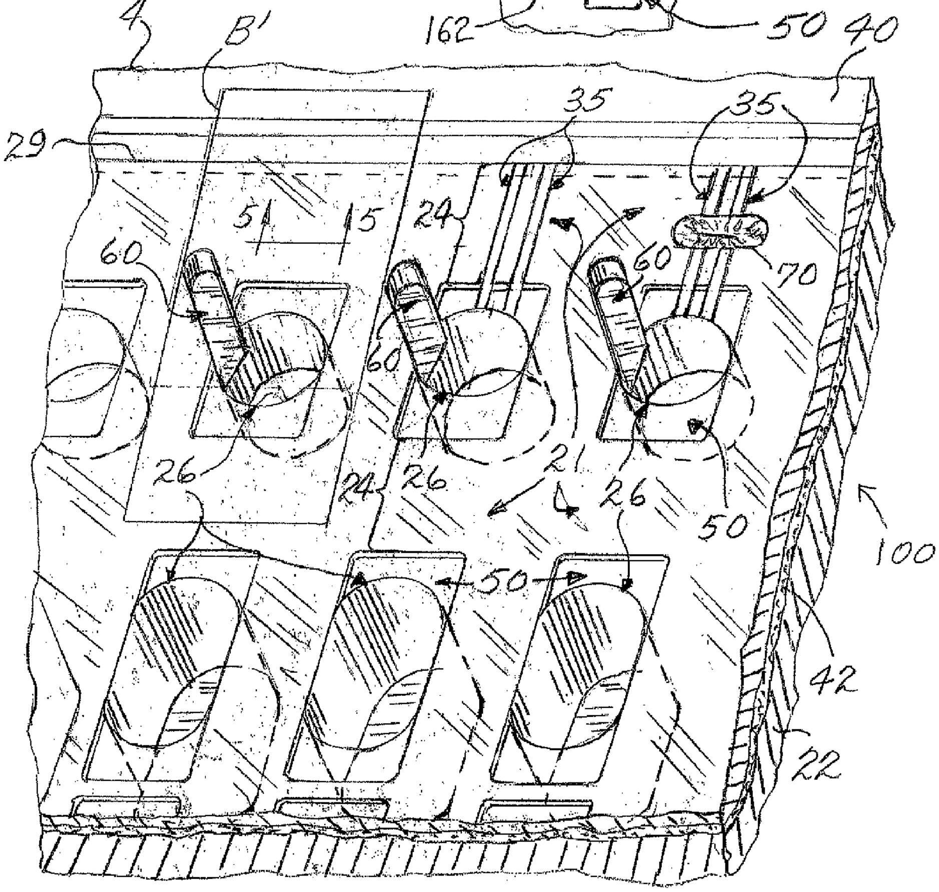
FIG. 4 is an enlarged, perspective view of region 4 taken from FIG. 2.

FIG. 4 shows an enlarged, perspective view of region 4 shown in FIG. 2. Intermediate walls 24, each forming a component of a respective Zbig valve 21, are shown in a non-deformed state in FIG. 4. A displaceable material trap 50 can be arranged on either or both sides, or in the vicinity of a Zbig valve 21. Greater details with regard to the structure and operation of displaceable material traps 50, are described in copending U.S. patent application Ser. No. 10/808,228, filed Mar. 24, 2004, to Cox et al., and entitled “Microfluidic Device Including Displaceable Material Trap, And System”, hereinafter referred to as Cox et al., and which is incorporated herein in its entirety by reference.

As shown in FIG. 4, a Zbig valve 21, along with one or more optional displaceable material traps 50, can be located between sample-containment features, such as sample wells 26, flow distributor 29, output wells (not shown), or any other feature formed in or on the device 100. According to various embodiments and as previously described above, various types of valves can be used to control fluid communication between the sample-containment features. As discussed with respect to FIG. 1, each Zbig valve 21 can be forcibly deformed by one or more deformers, such as with one or more opening or closing blades, to selectively open or close one or more fluid communications extending between respective adjacent sample-containment features. The deforming mechanism, assembly, and/or the system for deforming the device 100, can be of the type, and can be operated as, described in U.S. patent application Ser. No. 10/403,652, filed Mar. 31, 2003, which is incorporated herein in its entirety by reference.

According to various embodiments, the formation of one or more fluid communications between adjacent sample-containment features or wells of a device, can be even more fully understood with reference to FIG. 5. FIG. 5 shows a cross-sectional end view of a Zbig valve 21 taken through line 5-5 of FIG. 4, and further shows an opening deformer 36 retracted away from the Zbig valve 21. FIG. 5 shows the Zbig valve 21, after the opening deformer 36 has created a fluid communication opening 35 to place the flow distributor 29 and the initial sample well 26 in fluid communication. Initially, when it is desired to transfer a fluid sample from one sample-containment feature to another sample-containment feature, a movable support (not shown) can force a tip portion 38 of the opening deformer 36 into contact with the elastically deformable cover sheet 40 in an area in and around the intermediate wall 24 of the Zbig valve 21. The tip portion 38 can force the elastically deformable cover sheet 40 into the deformable material of the substrate 22. When forced into the substrate 22 with sufficient force, the tip portion 38 can displace adhesive from the adhesive layer 42, as well as deformable material forming the substrate 22, to thereby form a depression 19. Upon retracting the opening deformer 36 away from contact with the elastically deformable cover sheet 40, the depression 19 can partially define a fluid communication 35 that can provide a passageway between adjacent sample-containment features, such as between the flow distributor 29 and the initial sample well 26.

As shown in FIG. 5, upon retracting the opening deformer 36 from contact with the microfluidic device 100, the elastically deformable cover sheet 40 can rebound at least partially back toward its initial substantially planar orientation, while the deformable material of the substrate 22, if less elastic that the cover sheet 40, can remain deformed. As a result, the fluid communication 35 can be formed. The fluid communication 35 can be defined by the cover sheet 40 and the depression 19, and can extend to fluidically interconnect sample-containment features, such as one or more sample wells 26, flow distributor 29, outputs chamber 37, and the like. The depression 19 can exhibit a variety of cross-sectional shapes depending upon the tip design of the opening deformer 36. For example, an opening deformer design including a straight edge, a chisel-edge, a pointed-blade edge, and the like, can be used to form the depression 19 in the substrate 22. According to various embodiments, the shape of the tip portion 38 of the opening deformer 36, and the force applied to the microfluidic device 100 by the opening deformer can be arranged to prevent the opening blade from cutting or ripping through the cover sheet.

FIG. 6 illustrates an enlarged perspective view of the depression 19 that can be formed in the substrate 22 with an opening deformer (shown in FIG. 5). For the sake of clarity, a cover sheet and adhesion material arc not shown in FIG. 6. According to various embodiments, the depression 19 can extend between the flow distributor 29 and an inlet portion 23 of the sample well 26, along the entire length of the intermediate wall 24, and though the recessed portion 52 of a displaceable material trap that has been optionally provided.

Figure 7:
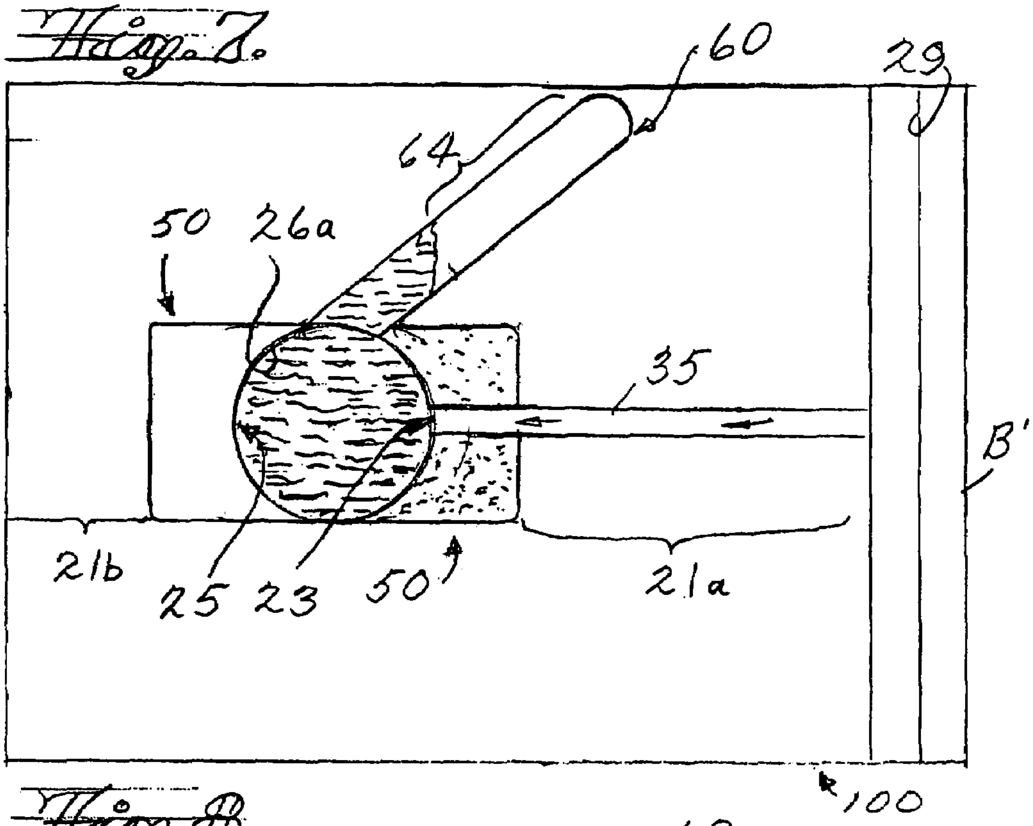
FIG. 7 is a top plan view of region B' of FIG. 4, showing a fluid communication between a loading channel and a sample-containment feature, and a gas trap or reservoir filled with a gas after a liquid transfer procedure for loading liquid into the sample-containment feature.

FIG. 7 schematically shows a top view of region B' of FIG. 4, and illustrates a Zbig valve 21*a*, along with a displaceable material trap 50, that have been subjected to an opening operation with an opening deformer. The Zbig valve 21*a* and the displaceable material trap 50 are located between the flow distributor 29 and an initial sample well 26*a*. In the embodiment shown in FIG. 7, a single fluid communication opening 35 is shown extending between the input chamber or flow distributor 29 and an input portion 23 of the sample well 26*a*, through the Zbig valve 21*a*, and through the displaceable material trap 50.

According to various embodiments, for example, the embodiment shown in FIG. 7, only a single fluid communication is provided between two liquid-containment features of a fluid processing device. Under some circumstances, the transfer of liquid from one liquid-containment feature, for example, flow distributor 29, to an adjacent feature, for example, sample well 26*a*, can be more difficult through only a single communication as opposed to a system that uses two or more communications, but the transfer can still be accomplished. According to various embodiments, methods can be used to transfer a fluid through such a single communication wherein the methods can involve multiple spinning and stopping cycles. According to such exemplary methods, back pressure created during a first spinning step, that may be sufficient to prevent the complete transfer of liquid from one feature to an adjacent feature, can be relieved by stopping the spinning and allowing the pressure in the two adjacent features to equilibrate. Such equilibration can include the bubbling of gas from one liquid-containment feature, through the single fluid communication, and into the adjacent fluid-containment feature. This percolation of liquid can be repeated until a complete transfer of liquid is accomplished, for example, after two or more spinning and stopping cycles. According to various methods, four such cycles, six such cycles, or more such cycles, can be included in the method to ensure a complete transfer of liquid from one liquid-containment feature to an adjacent liquid-containment feature, through a single fluid communication. Depending upon the spinning rate, for example, the number of revolutions per minute (rpm), and the sizes of the fluid communication and the adjacent liquid-containment features, only a single spin may be needed to completely transfer the liquid. Exemplary spinning rates can include rates as low as 500 rpm or lower to as high as 10,000 rpm or greater, for example, from about 1000 rpm to about 7500 rpm, from about 2000 rpm to about 7000 rpm, or from about 3000 rpm to about 6000 rpm.

According to various embodiments, after forming a fluid communication 35 between adjacent sample-containment features, the device 100 can be spun to centripetally force fluid samples through the features of the device 100. For example, referring to FIG. 7, by spinning the microfluidic device 100, a fluid sample can be forced to move in a radially outwardly direction, in the direction shown by the arrows, and thus in a direction from the flow distributor 29 to the sample well 26*a*, through the fluid communication 35. Simultaneously, a portion of the gas or air that is displaced by the fluid sample entering the sample well 26*a* can be directed to flow radially inwardly, into the input port 29, back through the fluid communications 35. As will be discussed below, at least a portion of the displaced air from the sample-containment feature can flow into a gas trap reservoir 60 disposed in fluid communication with sample well 26*a*.

Figure 8:
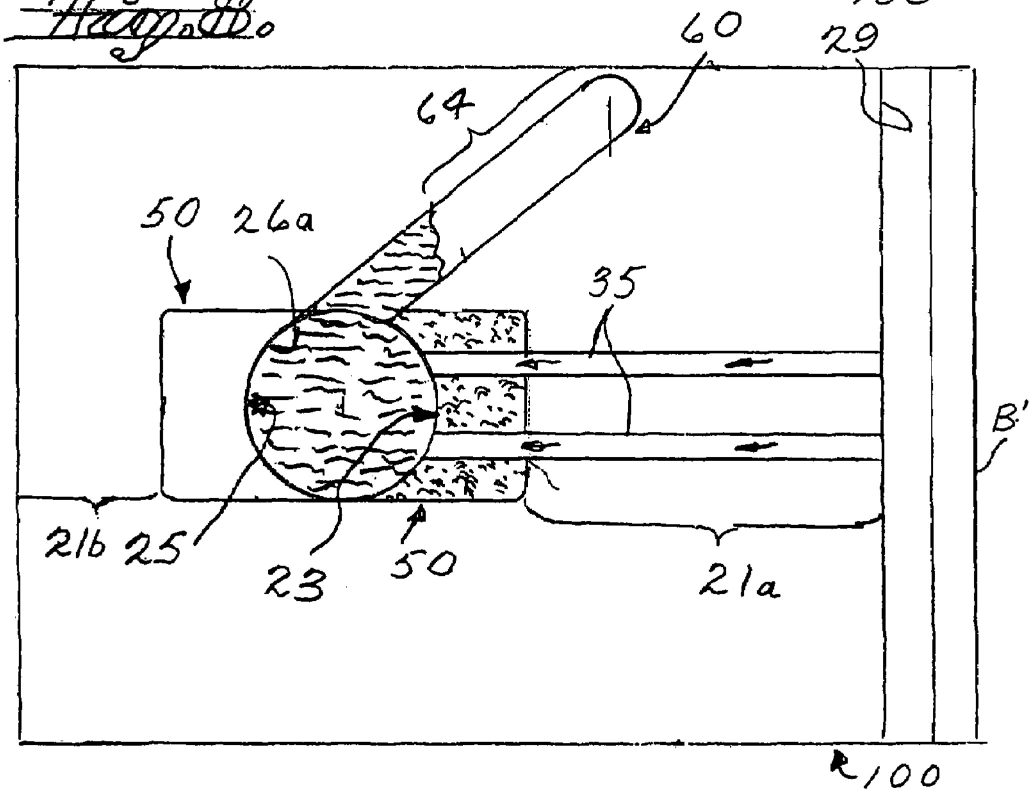
FIG. 8 is a top plan view of an alternative embodiment of region B' of FIG. 4, showing two fluid communications formed between the loading channel and the sample-containment feature and the gas trap filled with gas after the liquid has been transferred into the sample-containment feature.

FIG. 8 schematically shows a top view of region B' of FIG. 4, according to various other embodiments. FIG. 8 illustrates a Zbig valve 21*a*, along with a displaceable material trap 50, that has been subjected to an opening procedure that involves forming two fluid communications 35 between the flow distributor 29 and the sample well 26*a*. Each fluid communication 35 can extend between the flow distributor 29 and an input portion 23 of the sample well 26*a*, and through the Zbig valve 21*a* and the displaceable trap 50. The formation of more than one fluid communication 35 can increase the probability that a portion of the gas displaced by a fluid sample entering the sample well 26*a* will flow radially inwardly toward the flow distributor 29 when the fluid sample is forced into the sample well 26*a*. By allowing a portion of displaced gas to be removed through at least one fluid communication 35, a fluid sample can be more readily forced into a sample-containment feature. By increasing the number of fluid communications 35, the likelihood that a portion of the fluid sample will be retained in an initial sample-containment feature and not transferred, can be reduced.

According to various embodiments, and as shown in FIGS. 2, 4, 6, 7, and 8, one or more of the sample-containment features of the device 100, such as the sample wells 26, can be provided in fluid communication with at least one gas trap 60. A gas trap 60 can be arranged to receive a portion of the gas or air that is displaced from a sample-containment feature, as the sample-containment feature is loaded with a fluid sample. When it is desired to at least partially empty the loaded sample-containment feature, the displaced gas stored in the gas trap can allow the fluid sample to be expelled more efficiently from the sample-containment feature. According to various embodiments, the trapped gas can disrupt the surface tension of a liquid held in the sample-containment feature and thus promote expelling the liquid from the feature.

According to various embodiments and as shown in FIG. 6, a gas trap can be partially defined by a recess 62 formed in a surface of the substrate 22. When a cover sheet, as shown in FIGS. 2 and 4, is adhered to the surface 33 (FIG. 6) of the substrate 22 to cover the recess 62, the gas trap 60 can be provided in the form of a channel or chamber for receiving gas or air displaced from the sample well 26.

According to various embodiments, the recess 62 or bore of the gas trap 60 can be arranged in fluid communication with a sample-containment feature. According to various embodiments, the gas trap 60 can be arranged in fluid communication with the sample-containment feature at an upper portion of the sample-containment feature. As shown in FIG. 6, the sample well 26 can include a first bottom portion 31 that is arranged at a first depth, D. The first depth, D, can extend from a top surface 33 of the substrate 22 to the first bottom portion 31 of the sample-containment feature 26. The recess 62 of the gas trap 60 can include a second bottom portion 39 that is arranged at a second depth, d. The second depth, d, can extend from the top surface 33 of the substrate 22 to the second bottom portion 39. According to various embodiments, the second depth, d, can be less than the first depth, D. According to various embodiments, the second depth, d, can be less than or equal to about 50%, can be less than or equal to about 60%, or can be less than or equal to about 70%, of the first depth, D. For example, the second depth, d, can be about 0.5 mm, and the first depth, D, can be about 0.9 mm. According to various embodiments, a wall 70 can be provided that can separate the recess 62 of the gas trap from an optionally provided recess 52 of a displaceable material trap formed in the substrate 22.

According to various embodiments, the second depth, d, of the recess 62, and the first depth, D, of the sample-containment feature 26, can be equal. According to various embodiments, the depth of the sample-containment feature 26 and the depth of the recess 62 of the gas trap can extend through a thickness of the substrate 22 from a first surface 33 all the way to an opposite second surface 37. For example, the sample-containment feature 26 and the recess 62 can each have a depth of about 1.50 mm, when the substrate 22 has a thickness of about 1.50 mm. A cover sheet can be adhered to the first surface 33 and/or the second surface 37 of the substrate to at least partially define a portion of the sample-containment feature and at least partially define a portion of the gas trap.

According to various embodiments, the gas trap 60 can be defined by a blind bore or channel extending through a thickness of the substrate 22 between the surfaces thereof. The blind bore or channel defining the gas trap 60 can be arranged in fluid communication with one or more sample-containment features of the device. The blind bore or channel can have a circular, square, or rectangular cross-section, or the like.

According to various embodiments, the gas trap can be formed by bending, adding, raising, recessing, hollowing-out, or deforming a portion of the cover sheet of the microfluidic device with respect to the top surface of the substrate. As a result, a portion of the cover sheet is not adhered to the substrate, thereby forming a chamber that can be arranged in fluid communication with a sample-containment feature. The size, shape, and arrangement of such a chamber can include dimensions that can be substantially similar to those of a gas trap defined by a recess or bore formed in the substrate 22.

According to various embodiments and as shown in FIG. 2, each gas trap 60 can include an elongated shape including a longitudinal axis that can be arranged to extend in a direction substantially corresponding to (1) an axis of rotation of the device 100, (2) an axis of rotation of a platen including a device holder 110, or (3) both (1) and (2) when such axes are coaxially aligned with respect to one another. As shown in FIG. 2, in the operative position of the device 100, some or all of the longitudinal axes of the gas traps 60 can extend substantially in a direction toward one or both of the axes of rotation. According to various embodiments, longitudinal axes of some of the gas traps can extend in a direction toward one or both of the axes of rotation.

Figure 10:
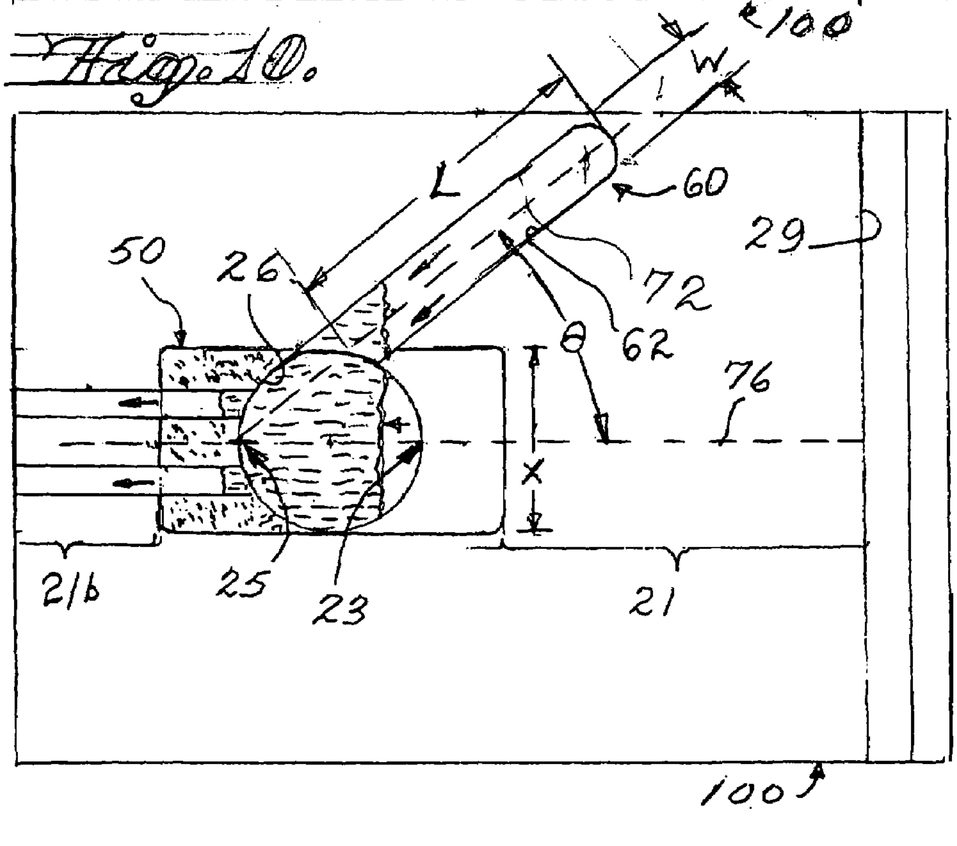
FIG. 10 is a top plan view of an embodiment of region B' taken from FIG. 4 and after two downstream fluid communications are formed extending from an outlet portion of the loaded sample-containment feature.

According to various embodiments and as shown in FIG. 10, a longitudinal axis 72 of the elongated recess 62 or bore of the air trap reservoir 60 can be arranged to extend in a direction that is angled with respect to a line intersecting a center of an inlet portion 23 and a center of an outlet portion 25 of a sample-containment feature 26. The line can extend co-axially with the direction of the series of sample-containment features in the respective sample-processing pathway. The inlet portion 23 of a sample-containment feature can include the portion of the sample-containment feature that can be arranged to communicate with one or more fluid supply communications. The outlet portion 25 of a sample-containment feature can include the portion of the sample-containment feature that can be arranged to communicate with one or more fluid exit communications. For example, in a device that can include a Zbig valve 21*a* and a trap arrangement 50, as shown in FIGS. 7 and 8, the inlet portion 23 can include the portion of the sample-containment feature communicates with one or more incoming fluid communications 35, and the outlet portion 25 can include the portion of the sample-containment feature opposite the inlet portion 23.

According to various embodiments and as shown in FIG. 10, a line intersecting the center of an inlet portion 23 and the center of an outlet portion 25 of the sample-containment feature 26 is shown as intersecting line 76. An angle, θ, defines an angle between a longitudinal axis 72 of the recess 62 or bore of the gas trap 60, and the intersecting line 76. According to various embodiments, the angle, θ, can be from about 10° to about 40°, from about 15° to about 35°, or from about 20° to about 30°.

According to various embodiments and as shown in FIGS. 2, 7, and 8, when a device 100 is operatively arranged on a rotating platen a portion 64 (shown in FIGS. 7 and 8) of the recess 62 (shown in FIG. 6) or bore of gas trap 60 can be arranged to be closer to an axis of rotation of the platen supporting the device 100, compared to any portion of the sample-containment feature that the gas trap 60 is arranged in fluid communication with. As a result as the sample-containment feature is being loaded with a liquid, at least the portion 64 of the gas trap 60 can hold and trap displaced gas or air from the sample-containment feature. According to various embodiments, the gas trap 60 can be angled in a direction toward the axis of rotation of the device 100 and/or toward an axis of rotation of a platen on which the device is to be operatively positioned.

Figure 9:
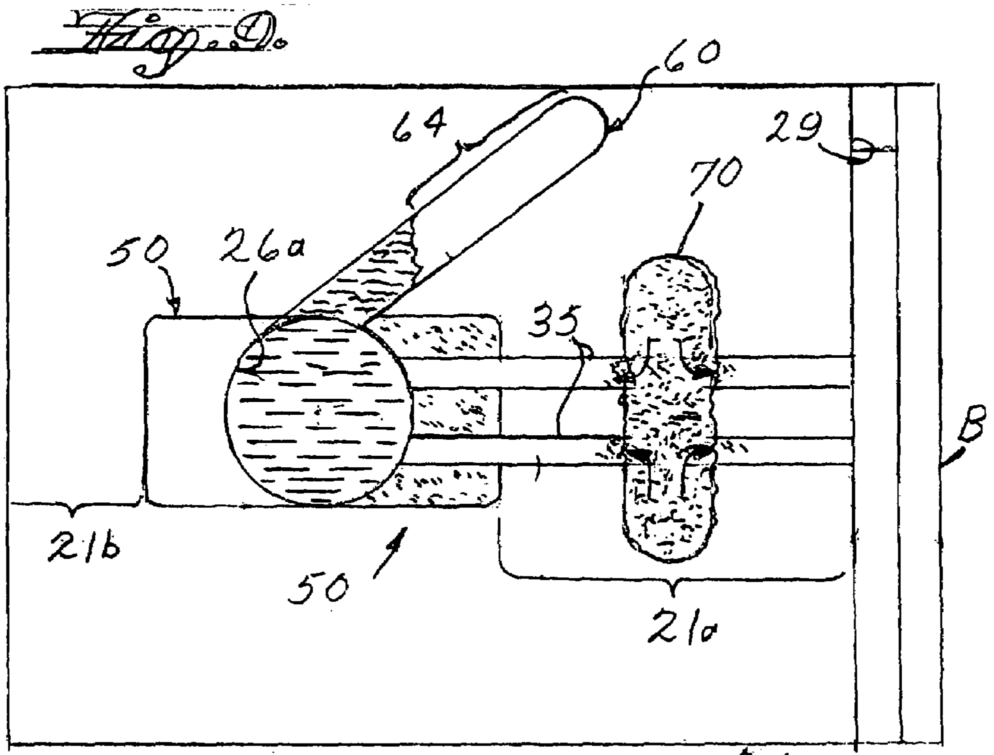
FIG. 9 is a top plan view of the device shown in FIG. 8 but after a deformer has deformed displaceable material and formed an interruption in each of the two fluid communications.

According to various embodiments, after loading a sample-containment feature with a liquid from a loading feature and displacing gas into a corresponding gas trap 60, a valve can be closed to interrupt fluid communication between the loading feature and the sample-containment feature. For example, FIG. 9 schematically illustrates a previously open Zbig valve 21*a* similar to that shown in FIG. 8, after it has been subjected to a closing operation with a closing deformer. According to various embodiments, a closing deformer can close the one or more fluid communications 35 by striking the Zbig valve 21*a* across a width of the one or more fluid communications 35. As shown in FIG. 9, a deformation 70 that can be formed by a closing deformer is shown extending across both fluid communications 35. Displaced adhesion material and/or substrate material can operate to block and close the one or more fluid communications 35, thereby isolating the loaded sample-containment feature 26*a* from an adjacent sample-containment feature, for example, from flow distributor 29.

According to various embodiments, a single closing deformer can be used alone, or in combination with one or more additional closing deformers, to form a barrier wall or dam of displaceable adhesive and/or to close-off one or more fluid communications formed between sample-containment features.

According to various embodiments, a valve can be provided that can control fluid flow into a sample-containment feature and can be designed to close automatically, or semi-automatically, after the loading of a sample-containment feature. For example, a closing element of the valve can be arranged to re-seat and close a fluid communication upon termination of a spinning operation.

According to various embodiments, after the liquid is processed in the loaded sample-containment feature, for example, after conducting a polymerase chain reaction of a biological sample in the sample-containment feature, the processed sample can be forced into a subsequently arranged, downstream sample-containment feature. According to various embodiments, the fluid sample can be forced into the subsequent sample-containment feature with or without first closing a valve that controls the supply of liquid into the loaded sample-containment feature. According to various embodiments, a valve 21*b*, as shown in FIGS. 7-10, can be opened to form a downstream fluid communication, for example, by forcibly deforming the valve 21*b* with one or more opening deformers, as described above and as described by the various applications incorporated herein by reference. The device 100 can then be spun again, forcing the processed sample to move into the subsequent sample-containment feature through the newly-opened valve 21*b*.

According to various embodiments, the displaced gas stored in the gas trap 60 during the filling operation can allow the processed sample to be expelled from the loaded sample-containment feature as centripetal force can be used to force out the processed sample. As the processed sample exits through the open valve 21*b* and into the subsequent sample-containment feature, the gas collected in the gas trap 60 can expand and move disrupting the gas-liquid interface between the gas and the processed sample. This description can assist in moving the processed sample out of the previously loaded sample-containment feature.

According to various embodiments, a length dimension, L, and a width dimension, W, of an elongated air trap reservoir 60, can be exemplified with reference to FIG. 10. According to various embodiments, the length, L, as measured along the longitudinal axis 72 of the gas trap 60, from the sample-containment feature to the distal end of the gas trap 60, can be as long as desired. The width, W, of the gas trap 60 can be as wide as desired. While a volume defined by the gas trap 60 can be infinitely larger than a volume defined by the sample-containment feature in fluid communication with the gas trap, the maximum dimensions of the length, L, and the width, W, of the gas trap 60 can each be made to be just less than the amount of space between respective sample-processing pathways when a plurality of pathways are included in or in the device. For example, in a device including sample-containment features having widths or diameters of from about 0.5 mm to about 2.0 mm, and a separation of about 1.0 mm between respective sample-processing pathways, the length, L, of the gas trap 60 can be from about 0.5 mm to about 2.5 mm, for example, from about 0.75 mm to about 1.5 mm. According to various embodiments, in a device including the noted exemplary dimensions, the width, W, of the gas trap 60 can be from about 0.1 mm to about 1.0 mm, for example, from about 0.3 mm to about 0.5 mm.

According to various embodiments, an exemplary gas trap formed as a recess in a surface of the substrate, can have a length, L, of about 1.50 mm, a width, W, of about 0.30 mm, and a depth, D, of about 0.5 mm. According to various embodiments, an exemplary gas trap formed by a bore through a thickness of a substrate, can have a length, L, of about 1.50 mm, and a diameter of about 0.30 mm. According to various embodiments, the walls defining the gas trap 60 can be curved, tapered, or smoothed at the corresponding intersections of the walls.

According to various embodiments, the gas trap can be sized such that it defines a volume that can be smaller than, equal to, or larger than, the volume of the sample-containment feature, with which the gas trap is in fluid communication. While the gas trap can define a volume that can be larger than the volume defined by the sample-containment feature, the maximum volume of the gas trap can be limited by the amount of space between respective sample-processing pathways. According to various embodiments, in a device including a sample-containment feature having a diameter of about 1.20 mm and a depth of about 0.9 mm, the volume of the gas trap can be from about two percent to about 50% volume of the sample-containment feature, for example, from about 5% to about 25% of the volume of the sample-containment feature. According to various embodiments, the volume of the gas trap can be from about 10% to about 20% of the volume of the sample-containment feature.

Figure 11:
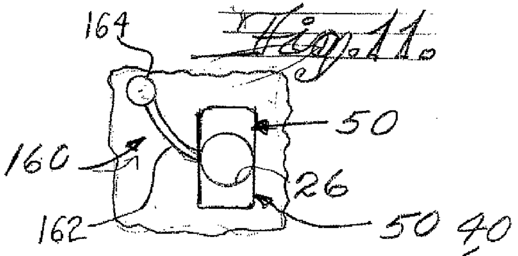
FIG. 11 is a top view of an air trap reservoir according to various embodiments, arranged in fluid communication with a sample-containment feature.

According to various embodiments, the recess of the air trap reservoir can extend outwardly from a sample-containment feature in various directions and can include various shapes and features. For example, as shown in FIG. 11, the air trap reservoir 160 can include a curved channel or bore 162 that can extend from a sample-containment feature 26 and can curve in a direction toward an axis of rotation. At the end of the curved channel 162, a reservoir tip 164 can be arranged that can act as an air receiving well.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A device comprising:

a substrate including a top surface and a bottom surface; and one or more sample processing pathways, each comprising a first sample-containment feature at least partially defined by the substrate and including an inlet portion and an outlet portion, and a reservoir in fluid communication with the sample-containment feature and comprising a distal end portion including a closed end, wherein the reservoir extends away from the outlet portion, and the distal end portion is arranged closer to the inlet portion than to the outlet portion.

2. The device of claim 1, wherein each of the one or more sample processing pathways further comprises an upstream sample-containment feature and a first valve arranged between the upstream sample-containment feature and the inlet portion of the first sample-containment feature, the first valve being capable of forming at least one fluid communication between the upstream sample-containment feature and the first sample-containment feature.

3. The device of claim 2, wherein the upstream sample-containment feature comprises a sample-loading manifold.

4. The device of claim 3, wherein each of the one or more sample processing pathways further comprises a fluid sample disposed in the upstream sample-containment feature and wherein the reservoir is capable of trapping gas displaced from the first sample-containment feature upon transferring the fluid sample from the upstream sample-containment feature into the first sample-containment feature.

5. The device of claim 1, wherein each of the one or more sample processing pathways further comprises a downstream sample-containment feature and a second valve arranged between the outlet portion and the first sample-containment feature, the second valve being capable of forming at least one fluid communication between the first sample-containment feature and the downstream sample-containment feature.

6. The device of claim 5, wherein each of the one or more sample processing pathways further comprises a liquid disposed in the first sample-containment feature and gas disposed in the reservoir, wherein when the second valve is opened, the gas in the reservoir is capable of assisting a transfer of the liquid from the first sample-containment feature through the second valve and into the downstream sample-containment feature.

7. The device of claim 1, wherein the reservoir extends in a direction that is angled at an angle of from about 10° to about 40° with respect to a straight line that intersects the inlet portion and the outlet portion.

8. The device of claim 1, wherein the reservoir extends in a direction that is angled at an angle of from about 20° to about 30° with respect to a straight line that intersects the inlet portion and the outlet portion.

9. The device of claim 1, wherein the first sample-containment feature has a volume and the reservoir defines a volume that is from about 10% to about 100% of the volume of the first sample-containment feature.

10. The device of claim 9, wherein the reservoir defines a volume that is from about 25% to about 75% of the volume of the first sample-containment feature.

11. The device of claim 1, wherein the device is disk-shaped and includes an axis of rotation.

12. The device of claim 11, wherein the reservoir extends in a direction toward the axis of rotation and the distal end portion of the reservoir is arranged closer to the axis of rotation than is the first sample-containment feature.

13. A system comprising:

a rotatable platen comprising an axis of rotation; and the device of claim 1, wherein the device is secured to the platen, the reservoir extends in a direction toward the axis of rotation, and the distal end portion of the reservoir is arranged closer to the axis of rotation than is the first sample-containing feature.

14. The device of claim 1, wherein the one or more sample processing pathways comprises a plurality of sample processing pathways.

15. The device of claim 1, wherein the one or more sample processing pathways comprises 48 or more sample processing pathways.

16. The device of claim 1, wherein at least one of the first sample-containment feature and the reservoir has one or more dimensions that is less than or equal to about 500 micrometers.

17. A device comprising:

a substrate including a top surface and a bottom surface; and one or more sample processing pathways, each comprising a first sample-containment feature formed in the substrate;

a second sample-containment feature formed in the substrate;

a fluid communication valve disposed between the first and second sample-containment features; and an elongated reservoir formed in the substrate and including a closed end;

wherein the first sample-containment feature is arranged in fluid communication with the elongated reservoir and the elongated reservoir extends in a direction away from the first and second sample-containment features.

18. The device of claim 17, wherein the fluid communication valve is open and provides a fluid communication between the first and second sample-containment features.

19. The device of claim 17, further comprising a liquid disposed in the first sample-containment feature and gas disposed in the elongated reservoir, wherein the fluid communication valve is capable of being opened and the gas in the elongated reservoir is capable of assisting a transfer of the liquid from the first sample-containment feature through the fluid communication valve and into the second sample-containment feature.

20. The device of claim 17, wherein the elongated reservoir extends in a direction angled at an angle of from about 10° to about 40° with respect to a straight line that intersects the first and second sample-containment features.

21. The device of claim 17, wherein the elongated reservoir extends in a direction angled at an angle of from about 20° to about 30° with respect to a straight line that intersects the first and second sample-containment features.

22. The device of claim 17, wherein the first sample-containment feature has a volume and The elongated reservoir defines a volume that is from about 10% to about 100% of the volume of the first sample-containment feature.

23. The device of claim 22, wherein the elongated reservoir defines a volume that is from about 25% to about 75% of the volume of the first sample-containment feature.

24. The device of claim 17, wherein the device is disk-shaped and includes an axis of rotation.

25. The device of claim 24, wherein the elongated reservoir extends in a direction toward the axis of rotation and the closed end of the elongated reservoir is arranged closer to the axis of rotation than is the first sample-containment feature.

26. A system comprising:

the device of claim 17;

a platen having an axis of rotation and capable of being rotated about the axis of rotation; and a holder capable of securing the device to the platen.

27. The system of claim 26, further comprising a drive assembly capable of rotating the platen about the axis of rotation.

28. The system of claim 26, wherein the holder secures the device to the platen such that the distal end portion of the reservoir is situated closer to the axis of rotation than is the first sample-containment feature.

29. The system of claim 26, wherein the device is disk-shaped and includes a central axis of rotation.

30. The system of claim 26, wherein the holder secures the device to the platen such that the central axis of rotation of the device and the axis of rotation of the platen are coaxial, and the reservoir extends in a direction towards the axis of rotation such that the closed end of the reservoir is arranged closer to the axis of rotation than is the first sample-containment feature.

31. The device of claim 17, wherein the one or more sample processing pathways comprises a plurality of sample processing pathways.

32. The device of claim 17, wherein the one or more sample processing pathways comprises 48 or more sample processing pathways.

33. The device of claim 17, wherein at least one of the first sample-containment feature and the reservoir has one or more dimensions that is less than or equal to about 500 micrometers.

* * * * *